US011369901B2

(12) United States Patent
Abokhalaf

(10) Patent No.: US 11,369,901 B2
(45) Date of Patent: Jun. 28, 2022

(54) HOLLOW FILTER ELEMENT OF A FILTER FOR FLUID, FILTER HOUSING, AND FILTER

(71) Applicant: MANN+HUMMEL GmbH, Ludwigsburg (DE)

(72) Inventor: Mahdi Abokhalaf, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 140 days.

(21) Appl. No.: 16/896,641

(22) Filed: Jun. 9, 2020

(65) Prior Publication Data

US 2020/0298152 A1 Sep. 24, 2020

Related U.S. Application Data

(63) Continuation of application No. PCT/EP2018/074518, filed on Sep. 11, 2018.

(30) Foreign Application Priority Data

Dec. 13, 2017 (DE) .................... 10 2017 011 523.0

(51) Int. Cl.
*B01D 35/147* (2006.01)
*B01D 35/30* (2006.01)
(Continued)

(52) U.S. Cl.
CPC ........... *B01D 35/147* (2013.01); *B01D 29/13* (2013.01); *B01D 35/16* (2013.01); *B01D 35/30* (2013.01);
(Continued)

(58) Field of Classification Search
CPC ...... B01D 35/147; B01D 29/13; B01D 35/16; B01D 35/30; B01D 2201/0415;
(Continued)

(56) References Cited

U.S. PATENT DOCUMENTS

2004/0154975 A1   8/2004  Girondi
2015/0157968 A1*  6/2015  Ardes ................. F01M 11/03
                                                    210/232

FOREIGN PATENT DOCUMENTS

DE        19829989 A1    1/2000
DE     102014004054 A1    9/2015
EP         1520611 A1    4/2005

* cited by examiner

*Primary Examiner* — Madeline Gonzalez

(57) ABSTRACT

A hollow filter element of a fluid filter has a coupling device for connecting with a first housing part of the filter housing when removing the hollow filter element from the second housing part. The coupling device is arranged at an axial end face opening of the hollow filter element. The hollow filter element can be joined by a rotation/insertion movement with the first or second housing part. The coupling device has guiding and entraining elements arranged circumferentially. A holding element extends circumferentially at the side of the guiding and entraining elements facing axially the outer side of the hollow filter element. Coupling elements for transmitting an axial pulling force can hook behind the holding element. The guiding and entraining elements are covered by the holding element radially inwardly and are connected force-transmittingly to the holding element so that the latter can be elastically stretched radially by them.

22 Claims, 7 Drawing Sheets

(51) Int. Cl.
*B01D 29/13* (2006.01)
*B01D 35/16* (2006.01)

(52) U.S. Cl.
CPC ............... *B01D 2201/0415* (2013.01); *B01D 2201/305* (2013.01); *B01D 2201/4007* (2013.01); *B01D 2201/4084* (2013.01)

(58) Field of Classification Search
CPC ...... B01D 2201/305; B01D 2201/4007; B01D 2201/4084; B01D 2201/291; B01D 2201/316; B01D 35/153
USPC .... 210/234, 450, 493.2, 455, 248, 435, 441, 210/442, 444, 437
See application file for complete search history.

HOLLOW FILTER ELEMENT OF A FILTER FOR FLUID, FILTER HOUSING, AND FILTER

CROSS-REFERENCE TO RELATED APPLICATIONS

This application is a continuation application of international application No. PCT/EP2018/074518 having an international filing date of 11 Sep. 2018 and designating the United States, the international application claiming a priority date of 13 Dec. 2017 based on prior filed German patent application No. 10 2017 011 523.0, the entire contents of the aforesaid international application and the aforesaid German patent application being incorporated herein by reference.

BACKGROUND OF THE INVENTION

The invention concerns a hollow filter element of a filter for fluid that is or can be exchangeably arranged in a filter housing of the filter.

Moreover, the invention concerns a filter housing of a filter for fluid in which at least one hollow filter element is or can be exchangeably arranged.

Moreover, the invention concerns a filter for fluid with at least one openable filter housing in which at least one hollow filter element is or can be exchangeably arranged.

EP 2 864 017 B1 discloses a liquid filter with a filter housing, a filter insert exchangeably arranged therein, and a screw cover. The filter insert is comprised of a filter material body which is framed at the bottom side by an end disc and at the top side by another end disc. In the interior of the filter insert, a support body in grid shape is arranged. At the upper end of the support body, coupling elements are formed integrally as teeth pointing in circumferential direction. At the valve housing, other coupling elements are formed integrally as teeth pointing in opposite direction. The teeth interact like a bayonet closure. The respectively interacting tooth flanks extend substantially in circumferential direction. The respective other tooth flanks extend at an angle at a slant relative to the circumferential direction wherein the angle is identical to or greater than the pitch of the screw thread between cover and filter housing. The tooth backs extend respectively in axial direction and rest against each other in one state. This state results when the screw cover is rotated in its fastening rotation direction. In this state, a torque can be transmitted from the screw cover to the support body but no axial pulling force.

DE 198 29 989 A1 discloses a filter element with a cylindrical filter bellows which is closed at its end faces by an end disc, respectively, comprised of a foamable film material. The filter element comprises moreover in the interior of the cylindrical bellows a support tube whose distal ends are provided with slots extending in axial direction, wherein the slots are spaced apart from each other in circumferential direction. The tongues which are formed by the slots are embedded such in the end disc material that the end disc material circumferentially projects to some extent inwardly in radial direction.

SUMMARY OF THE INVENTION

The invention concerns a hollow filter element of a filter for fluid that is or can be exchangeably arranged in a filter housing of the filter, having at least one filter element-associated coupling device of a coupling system for holding onto and/or being entrained by a first housing part of the filter housing at least upon removal of the hollow filter element from a second housing part of the filter housing, wherein the element-associated coupling device is arranged in the region of an end face opening of the hollow filter element that is axial relative to a virtual axis and that serves for receiving at least one housing-associated coupling device of the coupling system, wherein the hollow filter element, by means of a rotary and/or insertion movement about the axis, can be joined with the first housing part and/or the second housing part and/or separated by means of a rotary and/or pulling movement about the axis from the first housing part and/or the second housing part.

Moreover, the invention concerns a filter housing of a filter for fluid in which at least one hollow filter element is or can be exchangeably arranged, having at least one inlet for fluid to be purified and at least one outlet for purified fluid, and at least two housing parts which, for installation and removal of the at least one hollow filter element, can be separated at least partially from each other, wherein the at least two housing parts can be connected to each other by means of a rotary and/or insertion movement relative to a virtual axis and separated from each other by means of a corresponding rotary and/or pulling movement, wherein a first housing part, on a side which is axially facing the second housing part relative to the axis, comprises at least one housing-associated coupling device of a coupling system for holding and/or entraining the at least one hollow filter element, at least for removal of the at least one hollow filter element from the filter housing.

It is an object of the invention to design a hollow filter element, a filter housing, and a filter of the aforementioned kind in which an exchange of the hollow filter element can be further simplified.

This object is solved according to the invention for the hollow filter element in that the at least one element-associated coupling device comprises a plurality of guiding and entraining elements which are arranged circumferentially distributed relative to the axis and are configured to guide housing-associated coupling elements of the housing-associated coupling device, wherein upon rotation of the first housing part relative to the hollow filter element about the axis in a first rotation direction a movement of the guiding and entraining elements can be effected in a radial direction, and which are configured to hook the housing-associated coupling elements and prevent movement of the guiding and entraining elements in radial direction upon rotation of the first housing part relative to the hollow filter element in an opposite second rotation direction, and at least one holding element which is located at the side of the guiding and entraining elements which is axially facing the outer side of the hollow filter element relative to the axis, which, relative to the axis, extends at least partially circumferentially and behind which the housing-associated coupling elements for transmitting a pulling force that is axial relative to the axis can get hooked, and which covers the guiding and entraining elements radially inwardly at least in sections thereof, wherein the guiding and entraining elements, at least in radial direction relative to the axis, are connected force-transmittingly to the at least one holding element so that the at least one holding element by means of the guiding and entraining elements can be elastically moved or stretched in radial direction, wherein the guiding and entraining elements are asymmetrically configured relative to the axis.

The axis is preferably a longitudinal axis of the filter element.

According to the invention, on the part of the hollow filter element a plurality of guiding and entraining elements and at least one holding element are arranged which can interact with corresponding housing-associated coupling elements. With the guiding and entraining elements, the at least one element-associated holding element can be widened by stretching in a first rotation direction of the first housing part relative to the hollow filter element. In this way, the housing-associated coupling elements, which otherwise can lock behind the at least one holding element, can be axially moved past it. In this way, the filter element-associated coupling device can be separated from the housing-associated coupling device and the hollow filter element can be separated from the first housing part. In contrast thereto, in the opposite second rotation direction the guiding and entraining elements lock behind the corresponding housing-associated coupling elements so that a torque relative to the axis can be transmitted between the first housing part and the hollow filter element. In this way, the hollow filter element can be rotationally entrained about the axis upon rotation of the first housing part in this rotation direction. According to the invention, the function "holding" is separate from the function "releasing".

An advantage of the invention is that no precisely prescribed work procedure must be observed in order to separate the hollow filter element from the first housing part as is the case for the liquid filter of the prior art. In this way, damages upon separation of the components can be prevented. By the interaction of the element-associated guiding and entraining elements with the housing-associated coupling elements for a corresponding rotation of the hollow filter element relative to the first housing part, the at least one element-associated holding element can be widened in such a way that a snapping connection can be released. In this way, the at least one hollow filter element can be removed with minimal force expenditure.

For installation of the hollow filter element, the latter can be connected first to the first housing part by means of the coupling system. This can be realized without relative rotation movement solely by inserting or pushing into its end position up to a stop. In this context, the element-associated holding element can be initially widened by means of the housing-associated coupling elements, in particular in the form of knobs, which are attached to the outer circumference of the housing-associated coupling device until the housing-associated coupling device can glide past the guiding and entraining elements, in particular in the form of knobs, arranged at the radially inner circumference of the element-associated coupling device and finally snap into place in particular at a sealing surface.

Advantageously, the sealing surface can snap into place at the first housing part even when the hollow filter element is first inserted into the second housing part, in contrast to the described procedure, and subsequently the first housing part is connected to the second housing part.

When removing the hollow filter element from the filter housing, the first housing part is separated from the second housing part by means of a rotary and/or pulling movement. In this context, the aforementioned snap-on connection is not widened because the housing-associated coupling elements and the element-associated guiding and entraining elements each comprise knobs which are arranged in segments in sawtooth configuration. The sawtooth configuration prevents the housing-associated coupling elements and the element-associated guiding and entraining elements from gliding onto each other.

Advantageously, a gap that is continuous in radial direction relative to the axis and extends in axial direction can be provided between neighboring guiding and entraining elements, respectively. In this way, the guiding and entraining elements can be bent outwardly in radial direction, respectively. The bending movement of the guiding and entraining elements can be transmitted onto the at least one holding element so that the latter can be stretched in radial direction outwardly.

Advantageously, the guiding and entraining elements can be identical in regard to their configuration. Advantageously, the guiding and entraining elements can be arranged uniformly distributed about the circumference. In this way, the hollow filter element and the first housing part can be connected to each other in several possible rotational orientations relative to the axis.

Advantageously, the element-associated guiding and entraining elements can be connected mechanically to the at least one element-associated holding element. The guiding and entraining elements can advantageously be embedded in the material of the at least one holding element, in particular embedded by casting or by injection molding.

The axis can coincide with a housing axis of the filter housing, an installation/removal axis of the hollow filter element in at least one of the housing parts, in particular a housing pot, a connecting axis of the first housing part with the second housing part, in particular of the housing cover with the housing pot, and/or an element axis of the hollow filter element. When in the description reference is being had to "radial", "coaxial", "axial", "tangential", "circumferential", "concentric", "eccentric" or the like, this relates to the axis, if nothing else is mentioned.

A hollow filter element is characterized in that it has at least one element interior which is surrounded by filter medium. The filter medium can be flowed through by the fluid to be purified from the exterior to the interior toward the element interior, or in reverse. The element interior comprises at least one fluid passage toward the exterior through which, depending on the flow direction, the purified fluid can exit from the element interior or fluid to be purified can flow in. The filter medium can surround the element interior relative to an element axis in circumferential direction. At least at one axial end face relative to the element axis, the filter medium can be connected to an end body, in particular an end disc. At least one end body can comprise at least one through opening to the element interior.

Advantageously, the hollow filter element can comprise at least one support body, in particular a support tube. The support body can extend in the element interior in particular between the end bodies. A corresponding filter medium can be supported by means of the support body. Advantageously, a circumferential wall of the support body can be permeable for the fluid, in particular grid-shaped.

The hollow filter element can advantageously be a so-called round filter element with a round cross section, an oval round filter element with an oval cross section, a flat-oval round filter element with a flattened oval cross section, a conical round filter element in which the round cross section tapers in axial direction toward a main axis, a conical oval round filter element in which the oval cross section in axial direction tapers at least in the direction of a transverse axis, a conical flat-oval round filter element in which the flat-oval cross section in axial direction tapers at least in the direction of a transverse axis, or a hollow filter element with a different type, in particular a square, cross section and/or a different type of axial cross-sectional course in the direction of an element axis.

The filter medium can advantageously be circumferentially closed or open with respect to the element axis. The filter medium can be in particular folded or curved in a star shape, preferably zigzag-shaped or corrugated. The filter medium can also not be folded or not be curved.

The hollow filter element can advantageously be part of a motor oil filter of an internal combustion engine of a motor vehicle for purifying motor oil. The invention is however not limited to a motor oil filter of an internal combustion engine of a motor vehicle. Instead, it can also be used for different types of fluid systems, preferably liquid systems, in particular fuel systems, hydraulic systems, cooling systems, or fluid systems with urea-water solution, of motor vehicles or other machines for purifying corresponding fluids. The filter can also be used outside of automotive technology, in particular in industrial motors, for purifying corresponding fluids.

The invention can be used in motor vehicles, in particular passenger cars, trucks, buses, agricultural and/or construction vehicles, construction/agricultural machines, compressors, industrial motors or other devices in particular with internal combustion engines. The invention can be used for land vehicles, water vehicles, and/or aircraft.

In an advantageous embodiment, at least one of the guiding and entraining elements can be embodied on a circumferential side relative to the axis as an element-associated ramp section and on the opposite side in circumferential direction as an element-associated circumferential locking section. In this way, depending on the rotation direction of the hollow filter element relative to the first housing part, the housing-associated coupling elements can be guided along the ramp section. In this way, due to the rising radial height of the ramp section the guiding and entraining elements can be elastically moved outwardly in order to move the corresponding element-associated holding elements correspondingly in radially outward direction. In the corresponding opposite rotation direction, the housing-associated coupling elements can rest against the element-associated circumferential locking section and transmit a torque relative to the axis in this way.

In a preferred embodiment, the guiding and entraining elements can be asymmetrically formed relative to the (length) axis. The above described behavior with regard to the radial widening of the guiding and entraining elements by relative rotation of filter element and housing part in the first rotation direction and prevention of widening in the opposite second rotation direction can be particularly reliably achieved with such a configuration.

In a further advantageous embodiment, the element-associated ramp section rises radially inwardly relative to the axis toward the circumferential locking section and toward the end face outer side of the hollow filter element. In this way, a ramp effect can be obtained upon rotational movement in the corresponding rotation direction and/or upon pulling movement of the hollow filter element relative to the first housing part.

In a further advantageous embodiment, viewed in joining rotation direction of the first housing part with the second housing part, the element-associated ramp section can be arranged at the circumferentially rearward side and the element-associated circumferential locking section at the circumferentially leading side of the corresponding guiding and entraining element. In this way, upon rotation of the first housing part relative to the second housing part in joining rotation direction, the housing-associated coupling elements can be guided along the corresponding element-associated ramp sections without the hollow filter element being entrained upon rotation. In contrast, upon rotation in opposite rotation direction (opening rotation direction), the element-associated circumferential locking sections of the guiding and entraining elements and corresponding housing-associated circumferential locking sections of the housing-associated coupling elements can get hooked on each other so that upon separation of the first housing part from the second housing part the hollow filter element can be entrained rotationally by the first housing part.

The ramp or circumferential locking sections of the housing-associated coupling elements, which correspond with the ramp and circumferential locking sections of the element-associated guiding and entraining elements, are respectively arranged, relative to the circumferential direction, at oppositely positioned sides (in circumferential direction in front corresponding with in circumferential direction to the rear) in order to enable the described behavior.

In a further advantageous embodiment, the guiding and entraining elements can be realized in the region of an axial end of a support body of the hollow filter element. In this way, a stable force transmission between the guiding and entraining elements and the support body, in particular a support tube, can be realized. A mechanical load on a filter medium of the hollow filter element can thus be reduced.

In a further advantageous embodiment, the at least one holding element can be realized at an end face end body of the hollow filter element. In this way, the at least one holding element can be produced together with the end body. The end body can be advantageously a so-called end disc, in particular a film end disc. The at least one holding element can be in particular a circumferential inner rim of the end body, in particular of the end disc.

In particular, the axial end of the support body can be embedded at least in sections thereof in the end face end body whereby a particularly good force transmission from the support body into the end body is achieved. A film end disc is understood as an end disc which is comprised of a foamed and hardened plastic material. A filter medium is embedded in-situ in the material upon foaming. Such an end disc has the advantage of still having a sufficient elasticity in order to be radially widened, as described above. With end bodies of metal or hard plastic material, this would be achievable only with a greatly increased force expenditure. Alternatively or additionally, the support body can comprise a plurality of circumferentially distributed slots or gaps in the region of the axial end. In this way, the end body is provided at its free end with a crown shape which enables an easy and destruction-free radial widening.

The end body can advantageous be fastened at the end face of the hollow filter element, in particular glued, attached or embedded by injection molding or casting, or the like.

Advantageously, the at least one holding element can be embodied in the form of a defined film end disc geometry, a plastic clip-on construction, or the like.

Advantageously, the end face end body can have a central opening which is in particular coaxial to the axis. At least the housing-associated coupling device of the filter housing can be inserted at least partially into the opening.

Advantageously, a so-called bypass valve can be realized together with the housing-associated coupling device. In this way, the bypass valve can be accommodated in a space-saving way.

In a further advantageous embodiment, the hollow filter element can comprise at least one drainage control element for closing or opening a fluid drain of the filter housing which serves to drain fluid when removing the hollow filter element. When installing the hollow filter element in the filter housing, the housing-associated fluid drain can be automatically closed by the at least one element-associated drainage control element. Upon removal of the hollow filter element, the fluid drain can be automatically opened. In this way, fluid contained in the filter housing can drain through the fluid drain in order to prevent that the fluid can escape in an uncontrolled fashion into the environment, in particular upon filter exchange.

The at least one drainage control element can be realized as one piece or in a multi-part configuration with the hollow filter element. As one piece, the at least one drainage control element can be manufactured together with the hollow filter element. In a two-part configuration, the at least one drainage control element can be separately manufactured and subsequently connected to the hollow filter element. The at least one drainage control element can thus be reused upon exchange of the hollow filter element.

Moreover, the object is solved according to the invention for the filter housing in that the at least one housing-associated coupling device comprises a plurality of housing-associated coupling elements which, relative to the axis, are arranged circumferentially distributed and rise in radial direction from the interior to the exterior, wherein the coupling elements are embodied respectively at a circumferential side relative to the axis as housing-associated ramp section and at the circumferentially opposite side as housing-associated circumferential locking section, and wherein the coupling elements are embodied respectively as housing-associated end face locking section at an axial end face relative to the axis, which is facing away from the free side of the housing-associated coupling device.

According to the invention, the housing-associated coupling device is provided with housing-associated coupling elements which can interact with corresponding guiding and entraining elements and corresponding holding elements of an element-associated coupling device at the hollow filter element. Upon rotation of the first housing part relative to the hollow filter element about the axis in a corresponding rotation direction, the housing-associated ramp sections of the coupling elements can be guided in this context along the corresponding element-associated guiding and entraining elements, in particular element-associated circumferential ramp sections provided thereat, and in this way the element-associated guiding and entraining elements can be elastically moved in radial direction outwardly, in particular bent or stretched. Upon corresponding opposite rotation of the first housing part relative to the hollow filter element, the housing-associated circumferential locking sections can interact in a locking fashion with corresponding element-associated circumferential locking sections on the part of the element-associated guiding and entraining elements so that, upon rotation of the first housing part, the hollow filter element can be entrained by rotation in particular relative to a second housing part.

The housing-associated end face locking sections can lock behind the at least one element-associated holding element and upon pulling of the first housing part relative to the second housing part can thus transmit a corresponding axial pulling force to the hollow filter element.

By corresponding rotation of the hollow filter element relative to the first housing part when the filter housing is separated, the housing-associated circumferential ramp sections of the housing-associated coupling elements can be guided along the element-associated circumferential ramp section of the element-associated guiding and entraining elements and elastically stretch the latter in radially outward direction. The element-associated guiding and entraining elements bend in this context corresponding sections of the at least one element-associated holding element in radial direction outwardly so that the housing-associated end face locking sections of the housing-associated coupling elements can be moved past the at least one element-associated holding element in axial direction. In this way, the hollow filter element can be separated with a very minimal force expenditure, almost without force, from the first housing part.

Advantageously, the first housing part can be realized as a housing cover and the second housing part as a housing pot. The at least one hollow filter element can be arranged in the housing pot. A corresponding installation opening of the housing pot for the hollow filter element can be closed by the housing cover.

Advantageously, the first housing part and the second housing part can be connected to each other by a screw connection or by a bayonet-like connection. Screw connections and bayonet-type connections can be closed by means of combined rotary and insertion movements and opened by means of corresponding combined rotary and pulling movements.

In an advantageous embodiment, the housing-associated coupling elements can be arranged circumferentially spaced apart relative to the axis. In addition or alternatively, the element-associated guiding and entraining elements of the element-associated coupling device can be arranged circumferentially spaced apart relative to the axis. In this way, the element-associated guiding and entraining elements can be arranged in a simpler way between the housing-associated coupling elements and moved through them. Alternatively or additionally, it can be provided that the coupling elements are provided on a wall surface of a bypass valve housing of the first housing part. The bypass valve housing is located advantageously at a position which projects in general into the interior of the filter element.

In a further advantageous embodiment, the respective housing-associated ramp sections can rise, on the one hand, toward the corresponding housing-associated circumferential locking sections and, on the other hand, toward the corresponding housing-associated end face locking sections in radial direction outwardly relative to the axis. In this way, the element-associated guiding and entraining elements can be guided better in radial direction outwardly with the corresponding rotary and/or pulling movement.

In a further advantageous embodiment, viewed in joining rotation direction of the first housing part with the second housing part, the respective housing-associated ramp section can be arranged at the circumferentially leading side and the housing-associated circumferential locking section at the circumferential rearward side of the respective housing-associated coupling element. In this way, when assembling the first housing part and the second housing part, the housing-associated coupling elements can be guided along the corresponding element-associated guiding and entraining elements. In this way, it can be prevented that the hollow filter element is entrained upon rotation. In corresponding opposite rotation direction, i.e., in opening rotation direction, the housing-associated circumferential locking sections can lock at the corresponding element-associated circumferential locking sections of the element-associated guiding and entraining elements so that the hollow filter element can be rotationally entrained by the first housing part upon rotation of the first housing part relative to the second housing part.

In a further advantageous embodiment, the at least one housing-associated coupling device can be realized as one piece together with the first housing part or the at least one housing-associated coupling device can be realized as multi-part configuration together with the first housing part. In case of a one-piece realization, it is not required to assemble the participating components in a corresponding assembly step. In a multi-part configuration, the participating components can be manufactured separate from each other and connected to each other at a later point in time. A multi-part realization has in addition the advantage that a corresponding bypass valve can be realized in a simpler way together with the housing-associated coupling device.

In a further advantageous embodiment, the filter housing can comprise at least one fluid drain which, when the filter is operation-ready, is closed by at least one drainage control element on the part of the at least one hollow filter element and which can be automatically opened for draining fluid upon removal of the at least one hollow filter element. In this way, upon servicing of the filter, in particular when exchanging the at least one hollow filter element, it can be ensured that liquid fluid contained in the filter housing can drain in a controlled fashion and cannot escape into the environment.

Also, the object is solved according to the invention for the filter in that the hollow filter element is a hollow filter element according to the invention.

In an advantageous embodiment, the filter housing can be a filter housing according to the invention.

In other respects, the features and advantages which have been discussed in connection with the hollow filter element according to the invention, the filter housing according to the invention, and the filter according to the invention and their respective advantageous embodiments apply among each other and vice versa. The individual features and advantages can of course be combined with each other, wherein further advantageous effects may result which go beyond the sum of the individual effects.

BRIEF DESCRIPTION OF THE DRAWINGS

Further advantages, features, and details of the invention result from the following description in which an embodiment of the invention will be explained in more detail with the aid of the drawing. A person of skill in the art will consider the features disclosed in combination in the drawing, description, and the claims expediently also individually and combine them to expedient further combinations.

In the Figures, same components are provided with same reference characters.

DESCRIPTION OF PREFERRED EMBODIMENTS

Figure 1:
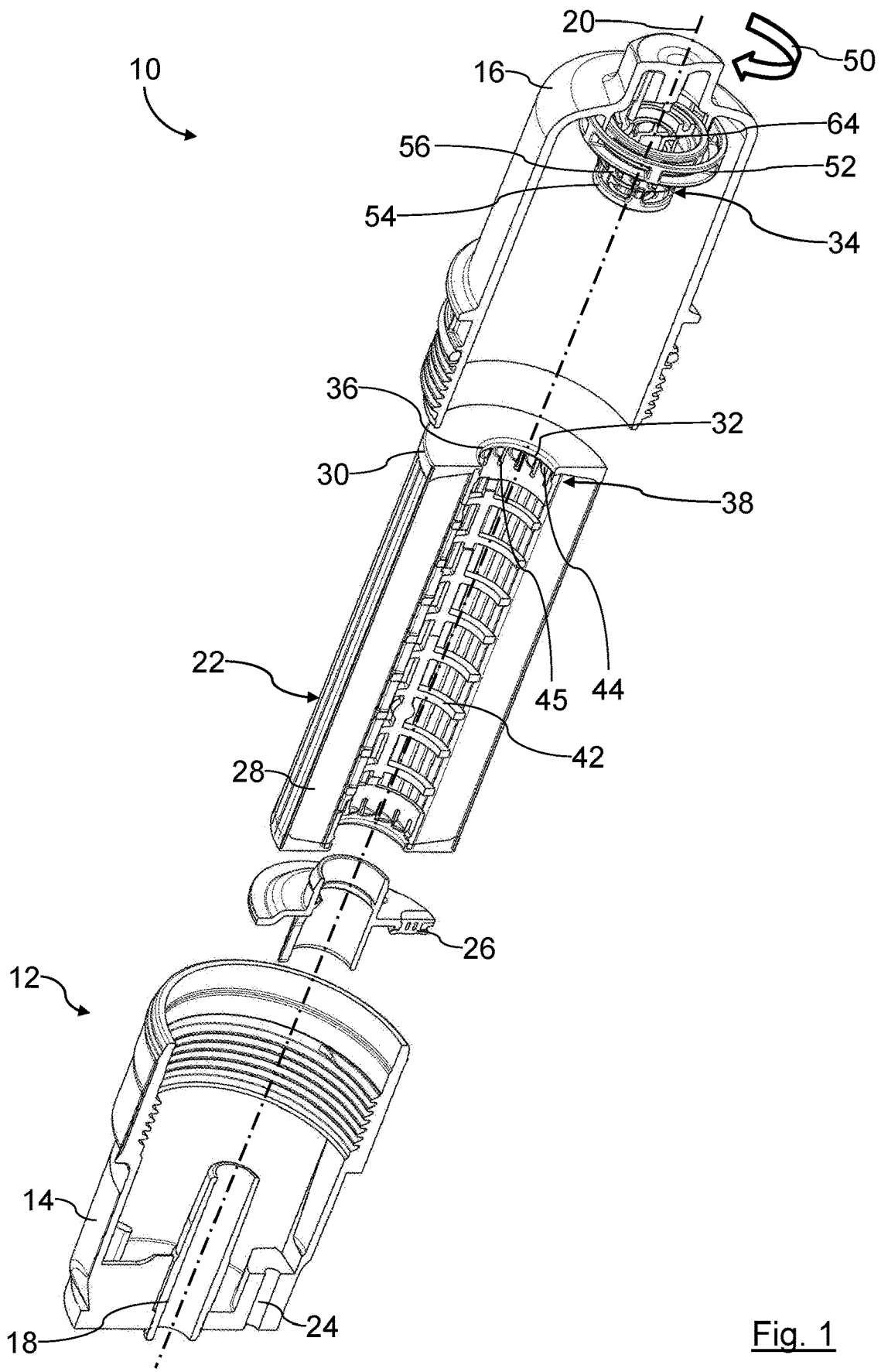
FIG. 1 shows a longitudinal section of a filter for liquid in an exploded view, with a filter housing in which a filter element is exchangeably arranged.

In FIGS. 1 to 6, a filter 10 for a fluid in the form of liquid is shown in different illustrations and section views. The filter 10 may be, for example, an oil filter for motor oil of a motor oil circuit of an internal combustion engine of a motor vehicle.

The filter 10 comprises a filter housing 12 with a housing pot 14 that can be closed by a housing cover 15. The housing pot 14 can be connected, for example, fixedly with the internal combustion engine or a frame part of the motor vehicle.

The housing pot 14 comprises an inlet, not illustrated, for liquid to be purified and an outlet 18 for purified liquid. The inlet and the outlet 18 can be connected, for example, to a liquid circuit, for example, the motor oil circuit. The inlet opens into an annular inlet space at the raw fluid side of the housing pot 14. The outlet 18 extends at the bottom coaxially out of the housing pot 14 at the clean fluid side. In reverse flow direction of the liquid through the filter 10, the inlet and the outlet 18 can also be switched.

A housing interior of the filter housing 12 is, for example, coaxial to a virtual axis 20. The housing interior serves as an installation space for a filter element 22.

The axis 20 coincides in the embodiment with a housing axis of the filter housing 12, an installation/removal axis of the filter element 22 into or out of the housing pot 14, an element axis of the filter element 22, and a connecting axis between the housing pot 14 and the housing cover 16. The filter element 22 can be joined by means of combined rotary/insertion movements relative to the virtual axis 20 with a housing cover 16, on the one hand, and the housing pot 14, on the other hand, and can be separated therefrom correspondingly by means of combined rotary/pulling movements. For better clarity, in the following the element axis, housing axis, connecting axis, and the installation/removal axis are provided with the same reference character 20 and are referred to for short as "axis 20". It is understood that, depending on the context, the housing axis, element axis, connecting axis and/or the installation/removal axis is intended. When in the following "radial", "coaxial", "axial", "circumferential" or the like is mentioned, this refers to the axis 20, if nothing else is mentioned.

At an end face which is facing the housing cover 16, the housing pot 14 comprises a coaxial installation opening for the filter element 22. In the operation-ready state, the installation opening is closed by the housing cover 16, as shown, for example, in FIG. 3. The housing cover 16 is detachably connected by means of a screw connection to the housing pot 14. For this purpose, the housing cover 16 comprises at its radially outer circumferential side a coaxial outer thread which corresponds with a corresponding coaxial inner thread of the housing pot 14. The threads in the disclosed embodiment are designed, for example, as so-called right-hand threads.

In a screw connection, a corresponding insertion movement or pulling movement is carried out by rotation of the components relative to each other so that a screw connection as a whole constitutes a combined rotation-insertion connection.

Moreover, the housing pot 14 comprises a drainage channel (fluid drain) 24 which is located eccentrically in the bottom region of the housing pot 14. Due to the drainage channel 24, liquid can drain from the filter housing 12 upon removal of the filter element 22. In this way, it can be prevented that liquid can escape in an uncontrolled fashion into the environment when exchanging the filter element 22. In the correctly mounted state in the filter housing 12, the filter element 22 is exchangeably arranged such that it separates the inlet from the outlet 18 and closes the drainage channel 24 by means of a corresponding element-associated drainage control element 26.

Figure 2:
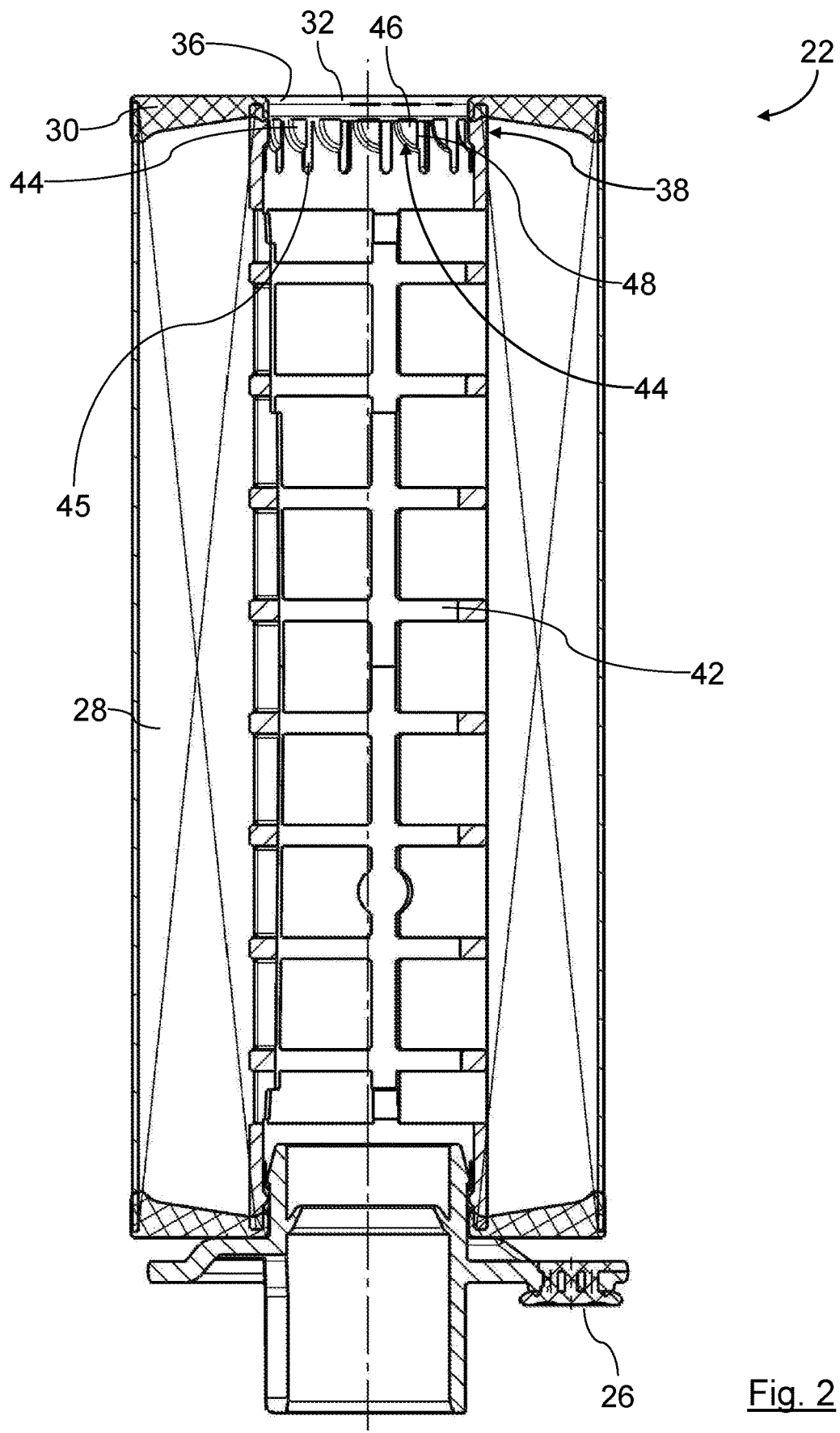
FIG. 2 shows a longitudinal section of the filter element of FIG. 1.

The filter element 22, which is illustrated in detail in FIG. 2, is designed as a so-called round filter element. It comprises a zigzag-folded circumferentially closed filter medium 28 in the form of a filter paper. The filter medium 28 surrounds an element interior of the filter element 22.

Figure 3:
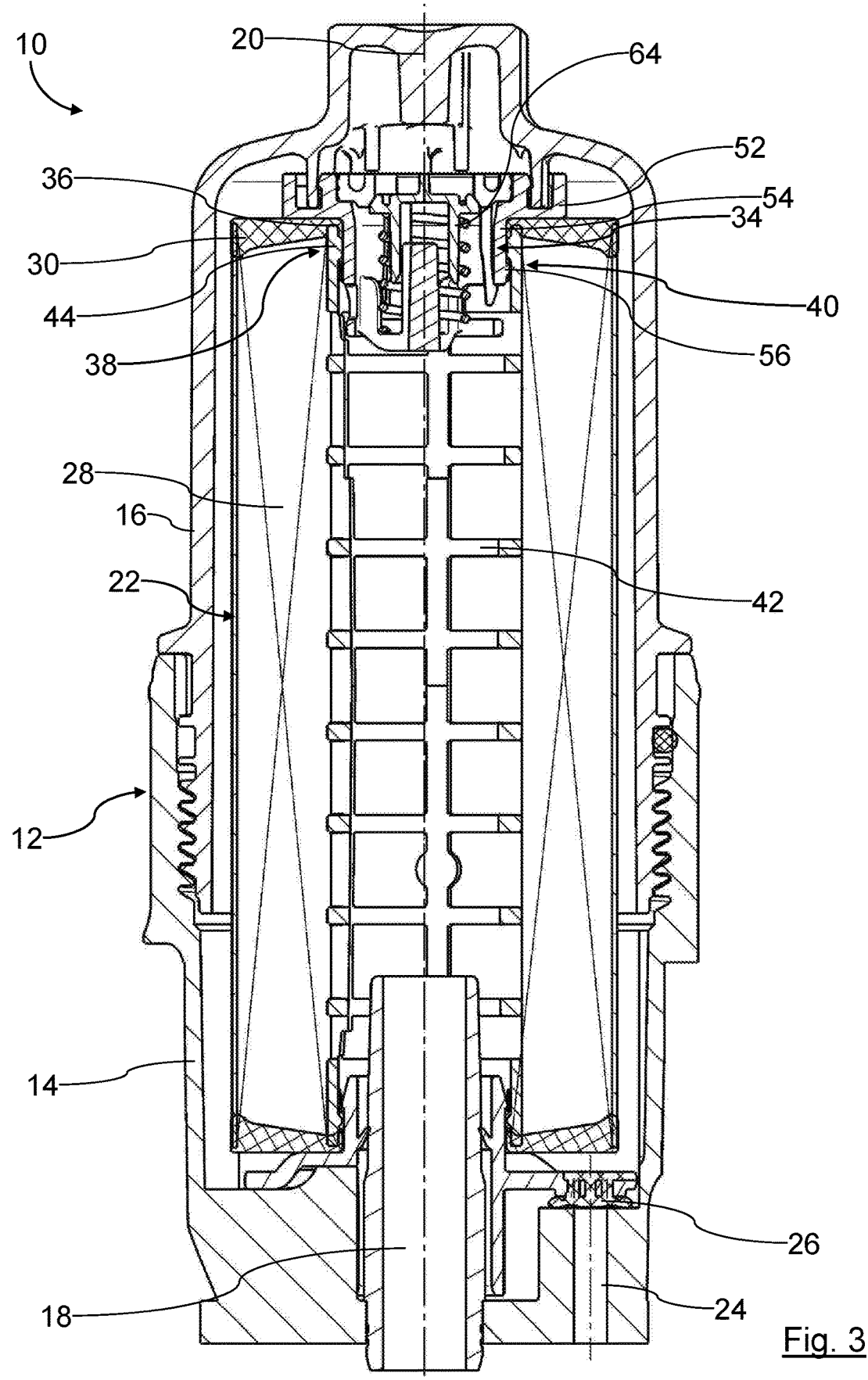
FIG. 3 shows a longitudinal section of the mounted filter of FIG. 1.

At its cover-facing end face which is axially facing the housing cover 16, the filter medium 28 is seal-tightly connected to an annular cover-facing end disc 30, for example, a film end disc. In the correct installation state, a housing-associated coupling device 34 projects into the element interior through a coaxial opening 32 of the cover-facing end disc 30, as shown in FIG. 3, for example.

The radially inner rim of the cover-facing end disc 30 forms a holding element 36 of an element-associated coupling device 38.

The housing-associated coupling device 34 and the element-associated coupling device 38 are parts of a coupling system 40 for holding the filter element 22 at the housing cover 16 and for entraining the filter element 22 with the housing cover 16.

Moreover, a coaxial grid-shaped support tube 42 is arranged in the element interior of the filter element 22. The filter medium 28 is supported radially inwardly at the support tube 42. The support tube 42 extends in axial direction between the two end faces of the filter element 22. The support tube 42 is connected with one end to the cover-facing end disc 30 in a force-transmitting way. The support tube 42 is connected with the axially oppositely positioned end to a bottom end disc which is not of interest in this context.

In the region of the cover-facing end of the support tube 42, a plurality of guiding and entraining elements 44 which are identical with respect to their shape and function are realized at the radially inner circumferential side. The guiding and entraining elements 44 are part of the element-associated coupling device 38.

The guiding and entraining elements 44 are designed as knobs which rise in radial direction from the exterior to the interior. The guiding and entraining elements 44 are arranged uniformly distributed in circumferential direction.

Between respectively neighboring guiding and entraining elements 44, a gap 45 is respectively provided which extends in axial direction and is continuous in radial direction. The gaps 45 are illustrated in FIGS. 1 and 2, for example. The guiding and entraining elements 44, which are thus circumferentially mechanically separated from each other, can be elastically bent in radial direction outwardly. In this way, an outer circumference of the support tube 42 can be as a whole enlarged in the region of its end.

As shown, for example, in FIG. 2, each guiding and entraining element 44 can be embodied on a circumferential side relative to the axis 20 as a ramp section 46. At the circumferentially oppositely positioned side, each guiding and entraining element 44 is designed as a locking section 48. The element-associated ramp section 46 rises radially inwardly toward the corresponding element-associated locking section 48 and toward the end face of the guiding and entraining element 44 facing the holding element 36 of the cover-facing end disc 30.

The ramp section 46 of each guiding and entraining element 44 is located, viewed in a joining rotation direction of the housing cover 16 with the housing pot 14, at the circumferentially rearward side. The locking section 48 is located at the corresponding circumferentially leading side of the guiding and entraining element 44.

In the illustrated embodiment, the joining rotation direction corresponds, for example, to the right-hand threads between housing pot 14 and housing cover 16. The joining rotation direction of the housing cover 16 is oriented clockwise, viewed axially from the exterior onto the housing cover 16.

Viewed in axial projection, the element-associated holding element 36 of the cover-facing end disc 30 covers the guiding and entraining elements 44 radially inwardly. The guiding and entraining elements 44 are force-transmittingly connected to the holding element 36. In this way, the holding element 36 can be widened by stretching in radial direction outwardly by corresponding bending of the guiding and entraining elements 44. In this way, the opening 32 can be enlarged by corresponding elastic movement of the guiding and entraining elements 44 and stretching of the holding element 36.

The drainage control element 26 is arranged, for example, by means of an insertion holder, not of interest in this context, eccentrically at the end face of the filter element 22 which is axially opposite the end face with the element-associated coupling device 38.

In the following, the housing-associated coupling device 34 on the part of the housing cover 16 will be described in more detail.

The housing-associated coupling device 34 comprises, for example, a coaxial fastening part 52 with a coaxial tube section 54 on the side which is axially facing away from the housing cover 16.

Figure 4:
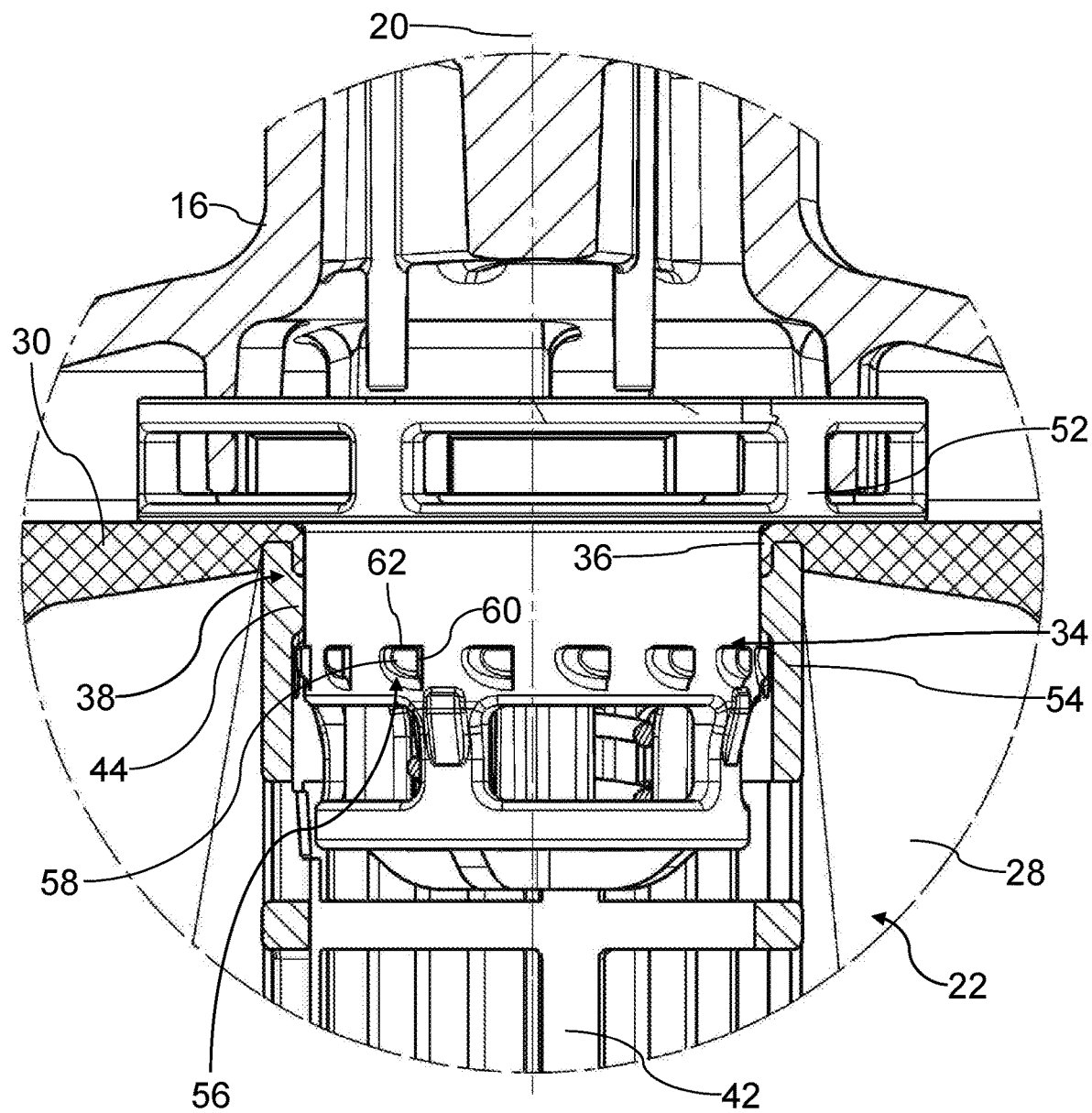
FIG. 4 shows a detail view of the longitudinal section of the mounted filter of FIG. 3 in the region of a coupling system between a housing cover of the filter housing and the filter element, wherein here a housing-associated coupling device of the coupling system is not shown in section.
Figure 5:
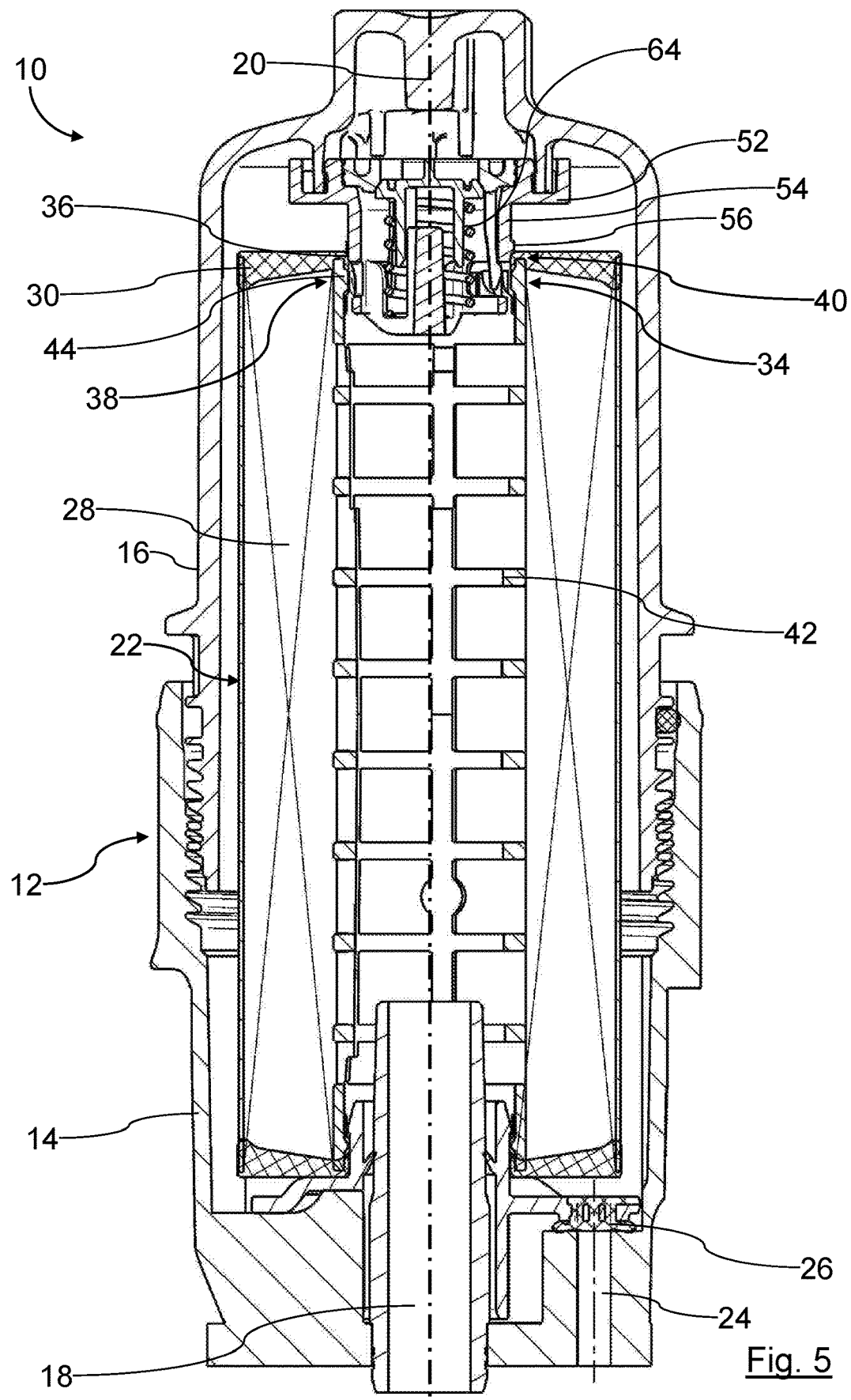
FIG. 5 shows a longitudinal section of the filter of FIGS. 1 and 3 in a mounting phase at the beginning of assembly of the housing cover with a housing pot of the filter housing.
Figure 6:
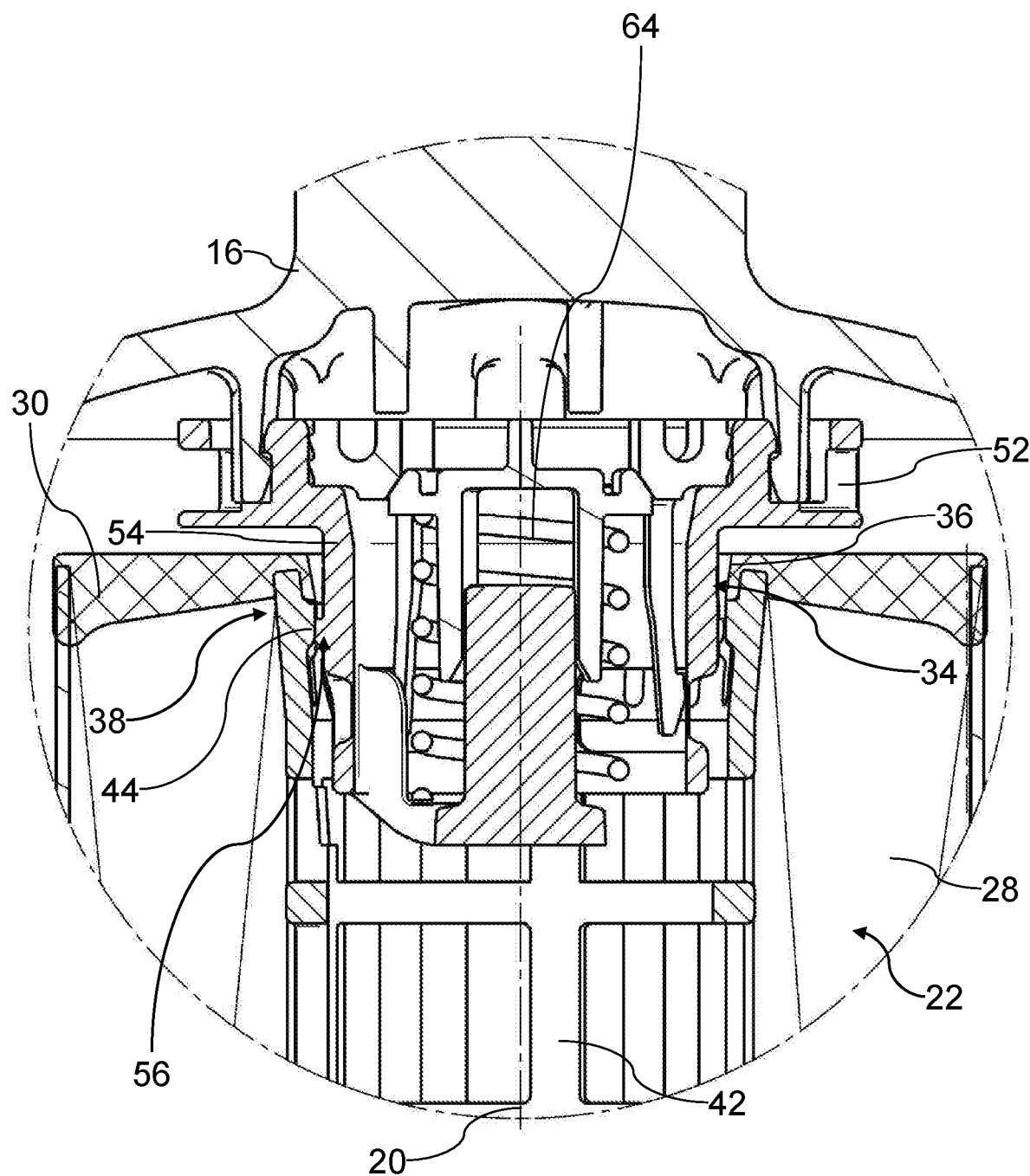
FIG. 6 shows a detail view of a longitudinal section of the housing cover and of the filter element in the region of the coupling system in a removal phase when separating the filter element from the housing cover.

At the radially outer circumferential side of the tube section 54, a plurality of housing-associated coupling elements 56 are arranged which are shown in FIG. 4, for example. The coupling elements 56 are identical in regard to their shape and function. The number of the coupling elements 56 corresponds to the number of the guiding and entraining elements 44 on the part of the element-associated coupling device 38. In regard to the axis 20, the coupling elements 56 are arranged uniformly distributed about the circumference. They rise in radial direction from the interior to the exterior, respectively.

Each coupling element 56 is embodied on a circumferential side relative to the axis 20 as a housing-associated ramp section 58 and at the oppositely positioned side in circumferential direction as a housing-associated circumferential locking section 60.

At an axial end face relative to the axis 20 which is facing away from the free side of the housing-associated coupling device 34, i.e., is facing the housing cover 16, each coupling element 56 is embodied as a housing-associated end face locking section 62.

The coupling elements 56 are arranged circumferentially spaced apart from each other so that the parts of the guiding and entraining elements 44 can pass through between them or can be arranged thereat.

The housing-associated ramp sections 58 rise radially outwardly, viewed toward the circumferential locking section 60 and toward the end face locking section 62, respectively. Viewed in joining rotation direction, the housing-associated ramp sections 58 are arranged at the circumferentially leading side of the respective coupling elements 56. The housing-associated circumferential locking sections 60 are arranged at the circumferentially rearward side of the respective coupling elements 56.

The diameter of a virtual coaxial circle through the radially outermost locations of the housing-associated coupling elements 56 is larger than the diameter of a corresponding virtual coaxial circle through the radial innermost locations of the element-associated guiding and entraining elements 44. Moreover, the diameter of the virtual circle through the radially outermost locations of the housing-associated coupling elements 56 is larger than the diameter of a virtual coaxial circle through the radially innermost locations of the element-associated holding element 36 of the element-associated coupling device 38 in its unstretched state.

The fastening part 52 of the housing-associated coupling device 34 is fastened at the inner side of the housing cover 16 in a two-part configuration. In the interior of the tube section 54, there is furthermore a bypass valve 64 which is not of interest here.

When assembling the filter 10, the preassembled filter element 22 is axially inserted into the housing pot 14, with the drainage control element 26 leading, and is aligned in a way not of interest in this context such that the drainage control element 26 closes the drainage channel 24.

Subsequently, the housing cover 16 is inserted in axial direction above the filter element 22 into the installation opening of the housing pot 14. Then the housing cover 16 is screwed in the joining rotation direction into the housing pot 14. A mounting phase in which the housing cover 16 is not yet completely screwed into the housing pot 14 is illustrated in an exemplary fashion in FIG. 5. In the illustrated mounting phase, the housing-associated coupling element 56 is still outside of the opening 32 of the cover-facing end disc 30 of the filter element 22.

When screwing in the housing cover 16 further into the housing pot 14, the housing-associated ramp sections 58 of the coupling element 56 are guided along the element-associated holding element 36 of the element-associated coupling device 38 and stretch the holding element 36 radially in outward direction. As soon as the housing-associated coupling elements 56 reach the region of the element-associated guiding and entraining elements 44 of the element-associated coupling device 38, the housing-associated ramp sections 58, upon screwing in the housing cover 16 further, are guided along the corresponding element-associated ramp sections 46 of the element-associated guiding and entraining elements 44 so that no torque is transmitted from the housing-associated coupling device 34 to the element-associated coupling device 38, i.e., no torque from the housing cover 16 to the filter element 22.

In the operating-ready final state which is illustrated in FIG. 3, the housing-associated coupling elements 56 are located at the side of the element-associated guiding and entraining elements 44 which are axially facing away from the cover-side end disc 30.

When removing the filter element 22, the housing cover 16 is unscrewed opposite to the joining rotation direction 50 from the housing pot 14. In this context, the housing-associated coupling elements 56 move in axial direction toward the element-associated guiding and entraining elements 44. Due to the rotation direction, the housing-associated circumferential locking sections 60 are positioned in the circumferential direction in a force-transmitting way at the element-associated locking sections 48 of the guiding and entraining elements 44 so that the filter element 22 is entrained in rotation upon unscrewing of the housing cover 16. The housing-associated end face locking sections 62 are contacting the inner side, axially facing the element interior, of the element-associated holding element 36 of the cover-facing end disc 30. By means of the housing-associated coupling elements 56, an axial pulling force is transmitted via the element-associated holding element 36 to the element-associated coupling device 38 and thus to the support tube 42. The entire filter element 22 is pulled in total with a rotary pulling movement out of the housing pot 14 in axial direction. In this context, the drainage control element 26 automatically opens the drainage channel 24 so that the liquid contained in the filter housing 12 can drain in a controlled fashion through the drainage channel 24.

As soon as the housing cover 16 has been separated completely from the housing pot 14 and the filter element 22 has been pulled out of the housing pot 14, the filter element 22 can be separated from the housing cover 16 by a rotation of the filter element 22 relative to the housing cover 16 opposite to the joining rotation direction. In this context, the housing-associated ramp sections 58 of the housing-associated coupling elements 56 interact with the element-associated ramp sections 46 of the guiding and entraining elements 44 in such a way that the guiding and entraining elements 44 are pushed elastically in radial direction outwardly and the holding element 36 is thus stretched radially in outward direction. The housing-associated end face locking sections 62 can pass through the stretched, widened opening 32 so that the element-associated coupling device 38 can be separated from the housing-associated coupling device 34.

Alternatively, the filter element 22 can be separated by a bending movement relative to the housing cover 16 almost without force from the housing cover 16.

Figure 7:
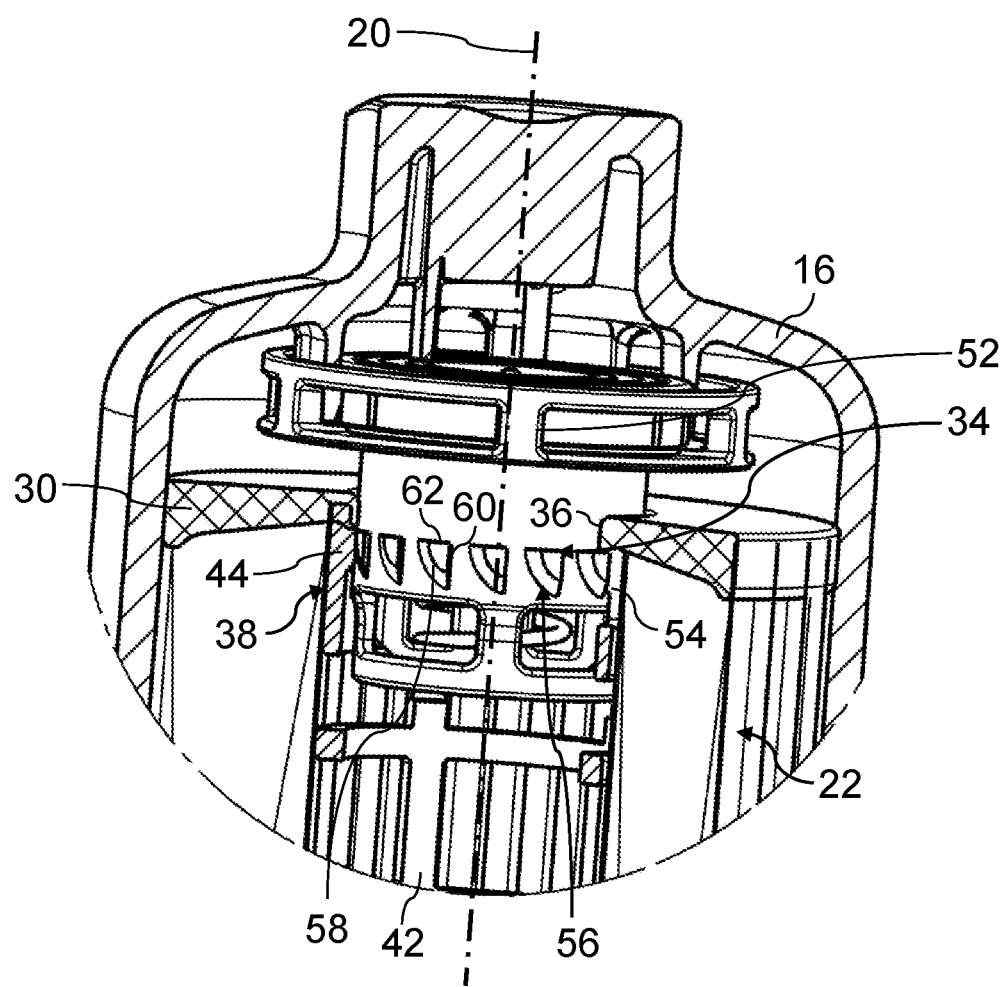
FIG. 7 shows a longitudinal partial section of the filter in a further assembly phase.

In FIG. 7, a further mounting phase of the filter according to the invention is illustrated in an isometric view. In this mounting state, the housing-associated coupling elements 56 have already passed through the end disc 30 of the filter element 22 whose inner circumference forms the holding element 36. It can be seen that the end face locking section 62 of the housing-associated coupling elements 56 already engages behind the inner circumference of the end disc 30 so that by means of this, as needed (unscrewing the housing cover 16), the filter element 22 can be also axially pulled out. Moreover, the different function of the housing-associated ramp sections 58 and of the housing-associated circumferential locking sections 60 is very clearly illustrated: when rotating the cover 16 clockwise, by interaction of the housing-associated ramp sections 58 with the filter element-associated guiding and entraining elements 44 or, more precisely, their ramp sections 46 (see FIG. 2), a movement of the filter element-associated guiding and entraining elements 44 in radial direction is effected. In this way, the end disc 30 is indirectly radially widened so that the engagement from behind of the end face locking section 62 of the housing-associated coupling elements 56 behind the inner circumference of the end disc 30 is released and the filter element 22 can be separated from the housing cover 16 without this requiring high removal forces. Upon counter-clockwise rotation of the cover 16, the circumferential locking sections 60 of the housing-associated coupling elements 56 impact on the corresponding circumferential locking sections 48 (see FIG. 2) of the filter element-associated guiding and entraining elements 44 so that thus no movement of the guiding and entraining elements 44 in radial direction and no radial widening of the end disc 30 are effected.

What is claimed is:

1. A hollow filter element of a filter for fluid, the hollow filter element configured to be arranged exchangeably in a filter housing of the filter, the hollow filter element comprising:
    a filter element-associated coupling device of a coupling system, wherein the coupling system is configured to hold or entrain the hollow filter element with a first housing part of the filter housing at least upon removal of the hollow filter element from a second housing part of the filter housing;
    wherein the hollow filter element is configured to be joined with the first housing part or with the second housing part by a rotary or insertion movement about a virtual axis of the hollow filter element;
    wherein the hollow filter element is configured to be separated from the first housing part or from the second housing part by a rotary or pulling movement about the virtual axis;
    an end face opening arranged at an axial end face of the hollow filter element that is axially arranged relative to the virtual axis, wherein the end face opening is configured to receive a housing-associated coupling device of the coupling system;
    wherein the filter element-associated coupling device is arranged in a region of the end face opening;
    wherein the filter element-associated coupling device comprises guiding and entraining elements arranged circumferentially distributed in a circumferential direction relative to the virtual axis;
    wherein the guiding and entraining elements are configured to guide housing-associated coupling elements of the housing-associated coupling device;
    wherein a rotation of the first housing part relative to the hollow filter element about the virtual axis in a first rotation direction effects a movement of the guiding and entraining elements in a radial direction relative to the virtual axis;
    wherein the guiding and entraining elements are configured to hook the housing-associated coupling elements and prevent a movement of the guiding and entraining elements in the radial direction when the first housing part is rotated relative to the hollow filter element in a second rotation direction opposite to the first rotation direction;
    a holding element located at an axial side of the guiding and entraining elements, wherein the axial side is axially facing an outer side of the hollow filter element;
    wherein the holding element extends at least partially in the circumferential direction;
    wherein the housing-associated coupling elements are configured to hook behind the holding element for transmitting an axial pulling force relative to the virtual axis;
    wherein the holding element covers the guiding and entraining elements in the radial direction inwardly at least in sections thereof;
    wherein the guiding and entraining elements, at least in the radial direction, are connected force-transmittingly to the holding element so that the holding element is configured to be elastically moved or stretched in the radial direction by the guiding and entraining elements;
    wherein the guiding and entraining elements are asymmetrically configured relative to the virtual axis.

2. The hollow filter element according to claim 1, wherein at least one of the guiding and entraining elements comprises a first side facing in the circumferential direction and a second side facing away from the first side in the circumferential direction, wherein the first side comprises an element-associated ramp section and the second side comprises an element-associated circumferential locking section.

3. The hollow filter element according to claim 2, wherein the element-associated ramp section rises in the radial direction inwardly toward the element-associated circumferential locking section and toward the axial end face of the hollow filter element.

4. The hollow filter element according to claim 2, wherein, viewed in a joining rotation direction of the first housing part with the second housing part, the first side comprising the element-associated ramp section is a circumferentially rearward side and the second side comprising the element-associated circumferential locking section is a circumferentially leading side.

5. The hollow filter element according to claim 1, further comprising an axial support body, wherein the guiding and entraining elements are realized in a region of an axial end of the axial support body.

6. The hollow filter element according to claim 5, further comprising an end face end body arranged at the axial end face of the hollow filter element, wherein the holding element is arranged at the end face end body.

7. The hollow filter element according to claim 6, wherein the axial end of the axial support body at least in sections is embedded in the end face end body.

8. The hollow filter element according to claim 7, wherein the axial support body comprises a plurality of circumferentially distributed slots or gaps in the region of the axial end of the axial support body.

9. The hollow filter element according to claim 6, wherein the axial support body comprises a plurality of circumferentially distributed slots or gaps in the region of the axial end of the axial support body.

10. The hollow filter element according to claim 6, wherein the end face end body is an end disc.

11. The hollow filter element according to claim 10, wherein the end disc comprises or is comprised of a foamed plastic material.

12. The hollow filter element according to claim 1, further comprising at least one drainage control element configured to closing or open a fluid drain of the filter housing, wherein the fluid drain is configured to drain fluid when removing the hollow filter element from the filter housing.

13. A filter for fluid comprising:
    the filter housing according to claim 1, configured to be openable; and
    the hollow filter element according to claim 1, wherein the hollow filter element is configured to be exchangeably arranged in the filter housing.

14. The filter according to claim 13, wherein the filter housing comprises:

an inlet for fluid to be purified and an outlet for purified fluid;

the first housing part and the second housing part configured to be separated at least partially from each other for installation and removal of the hollow filter element;

wherein the first housing part and second housing part are configured to be connected to each other by a rotary or insertion movement relative to a virtual axis and configured to be separated from each other by a rotary or pulling movement relative to the virtual axis;

wherein the first housing part, on a side thereof which is axially facing the second housing part relative to the virtual axis, comprises a housing-associated coupling device of a coupling system, wherein the coupling system is configured to hold or entrain the hollow filter element at least when removing the hollow filter element from the filter housing;

wherein the housing-associated coupling device comprises housing-associated coupling elements arranged circumferentially distributed in a circumferential direction relative to the virtual axis, wherein the housing-associated coupling elements rise outwardly in a radial direction relative to the virtual axis;

wherein the housing-associated coupling elements comprise a first side facing in the circumferential direction and a second side facing away from the first side in the circumferential direction, wherein the first side comprises a housing-associated ramp section and the second side comprises a housing-associated circumferential locking section;

wherein the housing-associated coupling elements each comprise an axial end face, wherein the axial end face is facing away from a side of the housing-associated coupling device that is facing the second housing part and comprises a housing-associated end face locking section.

15. A filter housing of a filter for fluid, wherein the filter housing is configured to exchangeably accommodate a hollow filter element, the filter housing comprising:

an inlet for fluid to be purified and an outlet for purified fluid;

a first housing part and a second housing part configured to be separated at least partially from each other for installation and removal of the hollow filter element;

wherein the first housing part and second housing part are configured to be connected to each other by a rotary or insertion movement relative to a virtual axis and configured to be separated from each other by a rotary and or pulling movement relative to the virtual axis;

wherein the first housing part, on a side thereof which is axially facing the second housing part relative to the virtual axis, comprises a housing-associated coupling device of a coupling system, wherein the coupling system is configured to hold or entrain the hollow filter element at least when removing the hollow filter element from the filter housing;

wherein the housing-associated coupling device comprises housing-associated coupling elements arranged circumferentially distributed in a circumferential direction relative to the virtual axis, wherein the housing-associated coupling elements rise outwardly in a radial direction relative to the virtual axis;

wherein the housing-associated coupling elements comprise a first side facing in the circumferential direction and a second side facing away from the first side in the circumferential direction, wherein the first side comprises a housing-associated ramp section and the second side comprises a housing-associated circumferential locking section;

wherein the housing-associated coupling elements each comprise an axial end face, wherein the axial end face is facing away from a side of the housing-associated coupling device that is facing the second housing part and comprises a housing-associated end face locking section.

16. The filter housing according to claim 15, wherein the housing-associated coupling elements are arranged circumferentially spaced apart from each other in the circumferential direction.

17. The filter housing according to claim 15, wherein the housing-associated coupling elements are arranged on a wall surface of a bypass valve housing of the first housing part.

18. The filter housing according to claim 15, wherein the housing-associated ramp sections rise outwardly in the radial direction toward the housing-associated circumferential locking sections and rise outwardly in the radial direction toward the housing-associated end face locking sections.

19. The filter housing according to claim 15, wherein, viewed in a joining rotation direction of the first housing part with the second housing part, the first side comprising the housing-associated ramp section is a circumferentially leading side and the second side comprising the housing-associated circumferential locking section is a circumferentially rearward side.

20. The filter housing according to claim 15, wherein the housing-associated coupling device is formed together with the first housing part as one piece.

21. The filter housing according to claim 15, wherein the housing-associated coupling device and the first housing part are formed together as a multi-part configuration.

22. The filter housing according to claim 15, further comprising a fluid drain configured to be closed, when the filter is operation-ready, by a drainage control element of the hollow filter element, wherein the fluid drain is configured to be automatically opened for drainage of fluid upon removal of the hollow filter element from the filter housing.

* * * * *